United States Patent
Helkey et al.

(10) Patent No.: US 7,110,633 B1
(45) Date of Patent: Sep. 19, 2006

(54) METHOD AND APPARATUS TO PROVIDE ALTERNATIVE PATHS FOR OPTICAL PROTECTION PATH SWITCH ARRAYS

(75) Inventors: Roger Jonathan Helkey, Montecito, CA (US); John Edward Bowers, Santa Barbara, CA (US); Adrian Keating, Santa Barbara, CA (US)

(73) Assignee: Calient Networks, Inc., San Jose, CA (US)

( * ) Notice: Subject to any disclaimer, the term of this patent is extended or adjusted under 35 U.S.C. 154(b) by 487 days.

(21) Appl. No.: 10/102,307

(22) Filed: Mar. 19, 2002

Related U.S. Application Data

(63) Continuation-in-part of application No. 09/929,631, filed on Aug. 13, 2001, now abandoned.

(51) Int. Cl.
*G02B 6/26* (2006.01)
(52) U.S. Cl. ....................................... 385/16
(58) Field of Classification Search ............ 385/16–23, 385/50, 129
See application file for complete search history.

(56) References Cited

U.S. PATENT DOCUMENTS

| | | | |
|---|---|---|---|
| 3,938,895 A | 2/1976 | Bridger et al. |
| 3,990,780 A | 11/1976 | Dakss |
| 4,046,454 A | 9/1977 | Pugh, III |
| 4,208,094 A | 6/1980 | Tomlinson, III et al. |
| 4,303,303 A | 12/1981 | Aoyama |
| 4,322,126 A | 3/1982 | Minowa et al. |
| 4,431,258 A | 2/1984 | Fye |
| 4,479,697 A | 10/1984 | Kapany et al. |
| 4,626,066 A | 12/1986 | Levinson |
| 4,696,062 A | 9/1987 | LaBudde |
| 4,701,011 A | 10/1987 | Emkey et al. |
| 4,790,621 A | 12/1988 | Calaby et al. |
| 4,812,002 A | 3/1989 | Kato et al. |
| 4,834,484 A | 5/1989 | Gorman et al. |
| 4,834,485 A | 5/1989 | Lee |
| 4,838,631 A | 6/1989 | Chande et al. |
| 4,838,637 A | 6/1989 | Torok et al. |

(Continued)

FOREIGN PATENT DOCUMENTS

DE 19757181 A1 7/1999

(Continued)

OTHER PUBLICATIONS

"Lucent's New All-Optical Router Uses Bell Labs Microscopic Mirrors," Bells Labs press release, pp. 1-4, Nov. 10, 1999. http://www.bell-labs.com/news/1999/november/10/1.html.

(Continued)

*Primary Examiner*—J. F. Duverne
(74) *Attorney, Agent, or Firm*—Blakely, Sokoloff, Taylor & Zafman LLP

(57) ABSTRACT

A method and apparatus are described to provide optical path protection for an optical switching system. An apparatus includes a first optical core switch, a second optical core switch, and an optical protection switch. The optical protection switch has at least two inputs and at least two outputs that allow the optical protection switch to direct input optical data traffic to one of the first optical core switch and the second optical core switch, and to direct a test signal to the other of the first optical core switch and the second optical core switch. For one embodiment, the optical protection switch is a 2×2 non-blocking optical switch having only two-path loss optimization. Alternatively, the optical protection switch may be a blocking 3×2 optical switch implemented to function as a 2×2 non-blocking optical switch. For one embodiment, the blocking 3×2 optical switch is a translational switch.

27 Claims, 13 Drawing Sheets

U.S. PATENT DOCUMENTS

| | | |
|---|---|---|
| 4,848,999 A | 7/1989 | Taylor |
| 4,859,012 A | 8/1989 | Cohn |
| 4,896,935 A | 1/1990 | Lee |
| 4,941,724 A | 7/1990 | Couden et al. |
| 4,952,010 A | 8/1990 | Healey et al. |
| 4,978,193 A | 12/1990 | Tomita |
| 4,981,335 A | 1/1991 | Gaebe |
| 4,993,796 A | 2/1991 | Kapany et al. |
| 5,031,987 A | 7/1991 | Norling |
| 5,077,622 A | 12/1991 | Lynch |
| 5,077,815 A | 12/1991 | Yoshizawa et al. |
| 5,135,590 A | 8/1992 | Basavanhally et al. |
| 5,177,348 A | 1/1993 | Laor |
| 5,185,846 A | 2/1993 | Basavanhally et al. |
| 5,199,088 A | 3/1993 | Magel |
| 5,255,332 A | 10/1993 | Welch et al. |
| 5,291,324 A | 3/1994 | Hinterlong |
| 5,305,402 A | 4/1994 | Hill et al. |
| 5,345,529 A | 9/1994 | Sizer, II et al. |
| 5,379,358 A | 1/1995 | Blyler et al. |
| 5,416,872 A | 5/1995 | Sizer, II et al. |
| 5,420,946 A | 5/1995 | Tsai |
| 5,436,986 A | 7/1995 | Tsai |
| 5,440,654 A | 8/1995 | Lambert, Jr. |
| 5,450,245 A | 9/1995 | Grotzinger et al. |
| 5,450,512 A | 9/1995 | Asakura |
| 5,467,191 A | 11/1995 | Kishner |
| 5,471,332 A | 11/1995 | Shiragaki et al. |
| 5,524,153 A | 6/1996 | Laor |
| 5,555,558 A | 9/1996 | Laughlin |
| 5,568,575 A | 10/1996 | Sato |
| 5,621,829 A | 4/1997 | Ford |
| 5,629,790 A | 5/1997 | Neukermans et al. |
| 5,647,033 A | 7/1997 | Laughlin |
| 5,648,618 A | 7/1997 | Neukermans et al. |
| 5,796,880 A | 8/1998 | Ford et al. |
| 5,815,624 A | 9/1998 | Rosenberg |
| 5,822,125 A | 10/1998 | Meyers |
| 5,828,800 A | 10/1998 | Henry et al. |
| 5,857,048 A | 1/1999 | Feuer et al. |
| 5,878,177 A | 3/1999 | Karasan et al. |
| 5,903,686 A | 5/1999 | MacDonald |
| 5,907,650 A | 5/1999 | Sherman et al. |
| 5,912,608 A | 6/1999 | Asada |
| 5,913,002 A | 6/1999 | Jiang |
| 5,943,454 A | 8/1999 | Aksyuk et al. |
| 5,960,132 A | 9/1999 | Lin |
| 5,960,133 A | 9/1999 | Tomlinson |
| 5,963,682 A | 10/1999 | Dorschner et al. |
| 6,002,818 A | 12/1999 | Fatehi et al. |
| 6,005,998 A | 12/1999 | Lee |
| 6,009,219 A | 12/1999 | Doyle |
| 6,049,412 A | 4/2000 | Bergmann et al. |
| 6,097,858 A | 8/2000 | Laor |
| 6,097,859 A | 8/2000 | Solgaard et al. |
| 6,097,860 A | 8/2000 | Laor |
| 6,101,299 A | 8/2000 | Laor |
| 6,124,956 A | 9/2000 | Severn |
| 6,137,926 A | 10/2000 | Maynard |
| 6,198,856 B1 | 3/2001 | Schroeder et al. |
| 6,236,481 B1 | 5/2001 | Laor |
| 6,249,626 B1 | 6/2001 | Bergmann |
| 6,253,001 B1 | 6/2001 | Hoen |
| 6,253,007 B1 | 6/2001 | Laughlin |
| 6,278,812 B1 | 8/2001 | Lin et al. |
| 6,289,145 B1 | 9/2001 | Solgaard et al. |
| 6,295,154 B1 | 9/2001 | Laor et al. |
| 6,320,993 B1 | 11/2001 | Laor |
| 6,320,997 B1 | 11/2001 | Dautartas et al. |
| 6,320,998 B1 | 11/2001 | Okayama et al. |
| 6,327,398 B1 | 12/2001 | Solgaard et al. |
| 6,328,482 B1 | 12/2001 | Jian |
| 6,330,102 B1 | 12/2001 | Daneman et al. |
| 6,334,014 B1 | 12/2001 | Nitta et al. |
| 6,337,760 B1 | 1/2002 | Huibers et al. |
| 6,396,976 B1 * | 5/2002 | Little et al. ................... 385/18 |
| 6,456,751 B1 | 9/2002 | Bowers et al. |
| 6,466,711 B1 | 10/2002 | Laor et al. |
| 6,473,544 B1 | 10/2002 | Daneman et al. |
| 6,483,961 B1 | 11/2002 | Helkey et al. |
| 6,483,962 B1 | 11/2002 | Novotny |
| 6,504,975 B1 | 1/2003 | Yamagata et al. |
| 6,549,691 B1 | 4/2003 | Street et al. |
| 6,549,692 B1 | 4/2003 | Harel et al. |
| 6,560,384 B1 | 5/2003 | Helkey et al. |
| 6,577,793 B1 | 6/2003 | Vaganov |
| 6,578,974 B1 | 6/2003 | Helkey |
| 6,585,383 B1 | 7/2003 | Helkey |
| 6,587,611 B1 | 7/2003 | Hunt |
| 6,610,974 B1 | 8/2003 | Hunt et al. |
| 6,612,706 B1 | 9/2003 | Helkey |
| 6,643,425 B1 | 11/2003 | Bowers et al. |
| 2002/0039464 A1 * | 4/2002 | Yoshimura et al. ........... 385/14 |
| 2002/0131700 A1 | 9/2002 | Nakama et al. |
| 2002/0191296 A1 | 12/2002 | Kusuyama |

FOREIGN PATENT DOCUMENTS

| | | |
|---|---|---|
| EP | 0 442312 A2 | 8/1991 |
| EP | 0 564210 A1 | 10/1993 |
| EP | 0 619505 A2 | 10/1994 |
| EP | 0 834759 A2 | 4/1998 |
| EP | 1 120677 A2 | 8/2001 |
| GB | 2 175 705 A | 12/1986 |
| JP | 62-258412 A | 11/1987 |
| JP | 04-204622 | 7/1992 |
| JP | 5-107485 A | 4/1993 |
| JP | 2000-19434 A | 1/2000 |
| WO | WO 99/66354 | 12/1999 |
| WO | WO 99/67666 | 12/1999 |
| WO | WO 00/20899 | 4/2000 |
| WO | WO 01/33898 A2 | 5/2001 |

OTHER PUBLICATIONS

D.T. Neilson, V.A. Aksyuk, S. Arney, N.R. Basavanhally, K.S. Bhalla, D.J. Bishop, B.A. Boie, C.A. Bolle, J.V. Gates, A.M. Gottlieb, J.P. Hickey, N.A. Jackman, P.R. Kolodner, S.K. Korotky, B. Mikkelsen, F. Pardo, G. Raybon, R. Ruel, R.E. Scotti, T.W. Van Blarcum, , L. Zhang, and C.R. Giles, "Fully Provisional 112×112 Micro-Mechanical Optical Crossconnect With 35.8Tb/s Demonstrated Capacity," OFC 2000 Tech. Dig., Baltimore, Maryland, pp. 202-204 (Mar. 7-10, 2000).

Lau, K.Y., "MEM's The Word for Optical Beam Manipulation," XP-000831634, IEEE Circuits and Devices Magazine, vol. 13, No. 4, pp. 11-18 (Jul. 1997).

V.A. Aksyuk, F. Pardo, C.A. Bolle, S. Arney, C.R. Giles, and D.J. Bishop, "Lucent Microstar Micromirror Array Technology for Large Optical Crossconnects," XP-001038165, Proceedings of the SPIE, Spie, Bellingham, VA, USA, vol. 4178, pp. 320-324 (2000).

C. Gonzalez and S.D. Collins, "Micromachined 1×n Fiber-Optic Switch," IEEE Photonics Technology Letters, vol. 9, No. 5, pp. 616-618 (May 1997).

A. Azzam, et al., *A Rotary electrostatic Micromotor 1×8 Optical Switch*, IEEE Journal of Selected Topics in Quantum Electronics, vol. 5 No. 1, Jan./Feb. 1999, pp. 26-31.

* cited by examiner

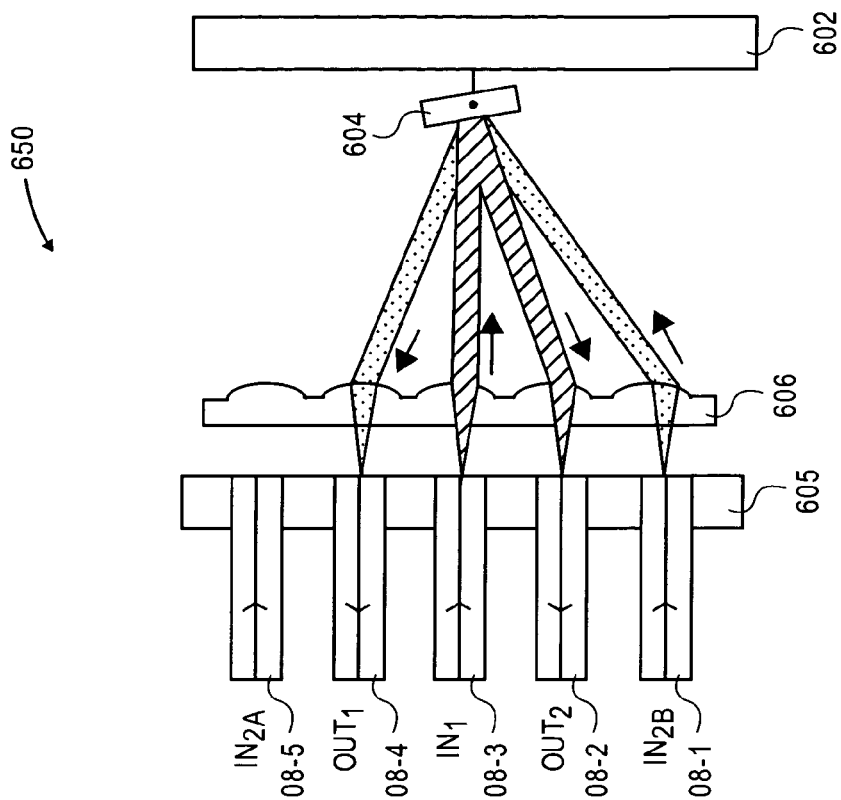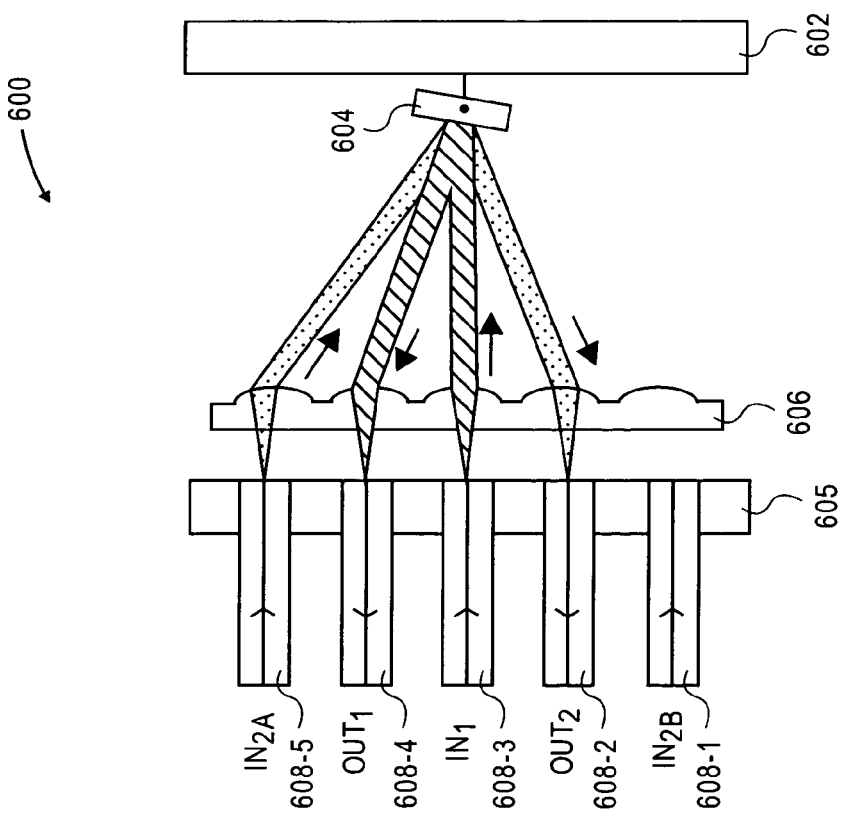

SIDE VIEW

END VIEW

METHOD AND APPARATUS TO PROVIDE ALTERNATIVE PATHS FOR OPTICAL PROTECTION PATH SWITCH ARRAYS

CROSS-REFERENCE TO RELATED APPLICATION

This application is a Continuation-in-Part of U.S. application Ser. No. 09/929,631, filed Aug. 13, 2001 now abandoned, entitled "METHOD AND APPARATUS TO PROVIDE ALTERNATIVE PATHS FOR OPTICAL PROTECTION PATH SWITCH ARRAYS", and claims priority from that application, which is assigned to the same assignee as the present application.

FIELD OF THE INVENTION

The present invention relates generally to fiber optics and optical switches. More particularly, the present invention relates to a method and apparatus to provide alternative paths for optical protection path switch arrays.

BACKGROUND OF THE INVENTION

An optical switch is a device that selectively couples light beams from input fibers to output fibers. An optical switch typically includes an optical switching core having miniaturized moveable mirrors that redirect light beams from input fibers to desired output fibers without conversion to electrical signals. A problem that can occur in an optical switch is component failure that can cause optical signal loss. To address component failure, an optical switch may include redundant optical switching cores ("switching cores"). That is, an optical switch may have an alternative switching path from a main switching core to a backup switching core in the event of a component failure to the main switching core.

Thus, an optical switch having redundant switching cores must provide an alternative path for an optical input. Furthermore, for proper coupling within an optical switch, an optical beam must enter or leave an optical fiber in a direct path. FIG. 1 illustrates a prior art 1×2 optical switch 100 having separate, discrete angled lens holders 160-1 through 106-3 for each separate optical fiber (e.g., $IN_1$, $OUT_1$, $OUT_2$). A light beam leaving $IN_1$ can thus travel along two alternative switch paths via $OUT_1$ or $OUT_2$ such that optical outputs $OUT_1$ and optical output $OUT_2$ can be directed to different switching cores.

Referring to FIG. 1, prior optical switch 100 includes one input fiber 108-2 for optical input ($IN_1$) and two output fibers 108-1 and 108-3 for optical outputs ($OUT_1$ and $OUT_2$), and a substrate 102 supporting a moveable mirror 104. Moveable mirror 104 redirects a light beam from optical input $IN_1$ to either optical output $OUT_1$ or optical output $OUT_2$ through separate lenses 105-3 or lens 105-1 in a direct path. In prior optical switch 100, the separate lenses 105-3 and 105-1 are held in separate lens holders 106-3 and 16-3, which have to be separately aligned to provide a direct path for light beams to enter into optical outputs $OUT_1$ and $OUT_2$.

A disadvantage of using prior optical switch 100 is that a separate lens holder (106-1 through 106-3) is needed for each optical input and output. In particular, requiring separate lens holders for each optical input or output increases fabrication costs. Another disadvantage of using prior optical switch 100 is that each lens holder must be separately aligned to provide a direct path for a light beam to enter a corresponding optical fiber. This increases the complexity for fabricating optical switches, especially if there are a large number of optical inputs and outputs. Another disadvantage of using prior optical switch 100 is that the lens holder is positioned in a curved manner around moveable mirror 104, which can be complicated to fabricate.

Another type of prior art optical switch providing alternative switch paths for an optical input is described in "A Rotary Electrostatic Micromotor 1×8 Optical Switch," by Yasseen et al., IEEE Journal of Selected Topics in Quantum Electronics, vol. 5, no. 1, January/February 1999. This type of 1×8 optical switch uses a rotary mirror in which output fibers are positioned around the rotary mirror to provide a direct path for an optical beam from an optical input that is redirected from the rotary mirror. Similar to prior optical switch 100, a disadvantage of this type of optical switch is that the output fibers have to be separately aligned, which can cause the fabrication of such an optical switch to be difficult and prevents increased capacity for coupling of optical fibers.

Optical protection switches may be implemented in a variety of ways each having advantages and drawbacks. When implementing an optical switch as a protection switch in an optical switching system, it is important to keep the loss through the optical switch as low as possible to minimize total path loss.

SUMMARY OF THE INVENTION

A method and apparatus are described to provide optical path protection for an optical switching system. In one embodiment an apparatus includes a first optical core switch, a second optical core switch, and an optical protection switch. The optical protection switch as at least two inputs and at least two outputs that allow the optical protection switch to direct input optical traffic to one of the first optical core switch and the second optical core switch, and to direct a test signal to the other of the first optical core switch and the second optical core switch.

Other features and advantages of the present invention will be apparent from the accompanying drawings, and from the detailed description, that follows below.

BRIEF DESCRIPTION OF THE DRAWINGS

The present invention is illustrated by way of example, and not limitation, by the figures of the accompanying drawings in which like references indicate similar elements and in which:

FIGS. 6A through 6B illustrate exemplary embodiments of side-views of the 3×2 or 2×3 optical switches of FIG. 5 providing alternative optical outputs for an optical input using a single fiber positioning fixture to position the optical inputs and outputs in a co-planar or parallel manner;

DETAILED DESCRIPTION

Figure 1:
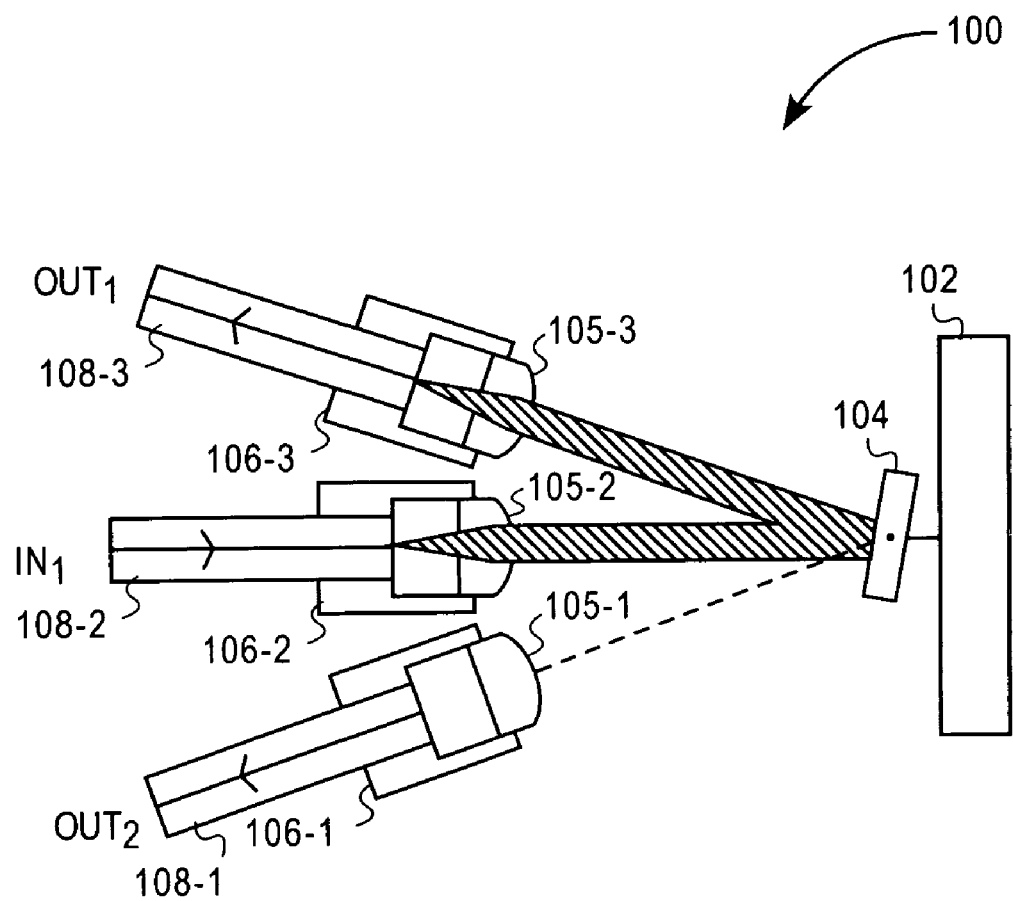
FIG. 1 illustrates a prior art 1×2 optical switch having separate, discrete angled lens holders for each optical fiber.

A method and apparatus are described to provide alternative paths for optical protection path switch arrays. In one embodiment, an apparatus includes a fiber positioning fixture, lens array, and moveable mirror. The fiber positioning fixture is used to position at least one input fiber and at least two output fibers. The lens array includes a plurality of lenses such that there is one lens for each input fiber and output fiber. The moveable mirror is used to couple optically each input fiber to one of at least two output fibers using the lens array.

For one embodiment, an apparatus includes a 2×2 non-blocking optical switch having only two-path loss optimization. For an alternative embodiment, an apparatus includes a blocking 3×2 optical switch implemented in place of a 2×2 non-blocking optical switch. For one embodiment, the blocking 3×2 optical switch is a magnetically actuated translational switch.

The following embodiments overcome disadvantages of prior optical switches providing alternative switch paths. In particular, by using a fiber positioning fixture and a lens array, a plurality of optical inputs and outputs can be positioned without using individual lens holders for each optical input and output. As such, the complexity for fabricating an optical switch providing alternative switch paths can be reduced. Furthermore, the switching capacity can be increased using the embodiments described herein. Alternative embodiments overcome other disadvantages of prior art optical switches providing alternative switch paths. In particular, for one embodiment, a 2×2 non-blocking optical switch having only two-path loss optimization may be less expensive and less complex to manufacture, and may provide greater path loss optimization. For one embodiment the optical switch implemented as a protection switch allows for testing and monitoring of the redundant path while not in use. Additionally, by using a 3×2 blocking switch in place of a 2×2 non-blocking switch, the complexity and expense of manufacturing an optical switching system that provides alternative switch paths may be reduced.

In the following description, an optical input or optical output refers to an optical fiber for outputting or receiving optical beams or light beams ("optical beams"). An optical fiber ("fiber") refers to a medium and technology to transmit light beams along a glass or plastic wire or fiber. The fiber can include a number of layers such as an inner layer ("core"). The core can be surrounded by a sheath or cladding that serves to confine light beams passing in the core. The cladding can be surrounded by a fiber buffer that acts to protect that cladding and core. Furthermore, in the following description, a photodetector refers to photosensitive devices such as, for example, a photodiode, phototransistor, or other like photosensitive devices, which can be used to detect optical beams for monitoring purposes.

In the following description, a single fiber positioning fixture refers to a fiber faceplate or substrate having a plurality of holes formed therein. The fiber positioning fixture can be fabricated from a monolithic substrate by etching holes therein. The holes can be arranged to position the optical fibers in a coplanar or parallel manner. Furthermore, the holes can be arranged to position the optical fibers in a two-dimensional array. A fiber faceplate may also include a plurality of plates having a plurality of holes etched therein to position and guide the optical fibers.

Figure 2A:
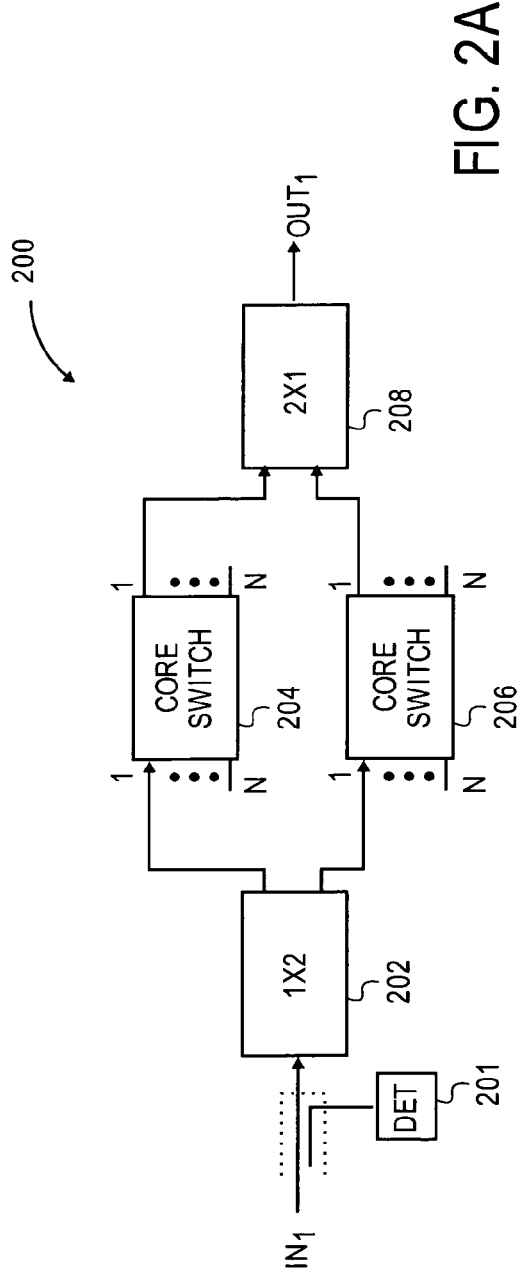
FIG. 2A illustrates one embodiment of an optical switching system providing alternative switch paths to redundant core switches using 1×2 and 2×1 optical switches to select a working switch path in which the present invention can be implemented.

FIG. 2A illustrates one embodiment of an optical switching system 200 providing alternative switch paths to redundant core optical switches 204 and 206 ("core switches") using 1×2 and 2×1 optical switches 202 and 208, respectively, to select a working switch path. In the example of FIG. 2A, one of the core switches 204 and 206 can be a main core switch and the other a backup core switch. Although one 1×2 and 2×1 optical switches 202 and 208 are shown, an array of 1×2 and 2×1 optical switches can be used at the switch input and output to direct input optical beams (e.g., $IN_1$) and output optical beams (e.g., $OUT_1$) to and from a main core switch or a backup core switch—e.g., core switches 204 or 206.

In one embodiment, the core switches 204 and 206 are "all-optical" switches using scanning mirror arrays to couple optical inputs (1 through N) to optical outputs (1 through N). The scanning mirror arrays may include miniature micro-electrical-mechanical-systems (MEMS) mirror devices. For example, the mirror devices can rotate about a hinge caused by electrostatic actuation. Each output of a 1×2 optical switch is an input to core switches 204 and 206, and each output of core switches 204 and 206 is an input to a 2×1 optical switch. Thus, an optical beam from $IN_1$ can pass through core switch 204 or core switch 206 based on the selected output of 1×2 optical switch 202 and the selected input of 2×1 optical switch 208. For one embodiment, the 2×1 optical switches and the 1×2 optical switches are identical, but connected in a reverse order. For alternative embodiments, optical power splitters and combiners may be used in place of the 1×2 and 2×1 optical switches.

A photodetector ("DET") 201 can also be implemented within optical switching system 200 to monitor optical beams or light beams from input or output fibers. For example, an optical fiber can be coupled to a optical splitter in which an optical beam can be directed to a photodetector or the optical beam can be passed on for switching. In the example of FIG. 2A, photodetector 201 is used to monitor optical beams or light beams passing through an input fiber $IN_1$. Photodetector 201 can also be used to monitor light beams passing through an output fiber such as $OUT_1$.

Low losses are an essential requirement in protection switches. Typically, 1×2 switch, such as switch 102, can be made lower in loss than a non-blocking 2×2 switch. In this sense, "non-blocking" refers to a switch in which any input can go to any output,—i.e, there is no input that is blocked to any output. The reason 1×2 switches can be made lower loss is that with a 1×2 switch there are only 2 degrees of freedom to optimize and there are only two optical paths. Therefore both can be optimized. However, non-blocking 2×2 switches have a total of four (4) paths, of which only two (2) can be optimized independently. The typical requirement in manufacturing a 2×2 non-blocking switch is to achieve low loss on all ports, so the optimization is averaged over all four ports. Thus, the loss is higher for each of the four ports of a 2×2 non-blocking switch than for either of the two optimized ports of the 1×2 switch. Unfortunately, while 1×2 switches can be made lower in loss than non-blocking 2×2 switches, non-blocking 2×2s are more useful in protection switching applications because the second input port of the non-blocking 2×2 switch may be used to send a test signal through the redundant path or to monitor the redundant path.

Figure 2B:
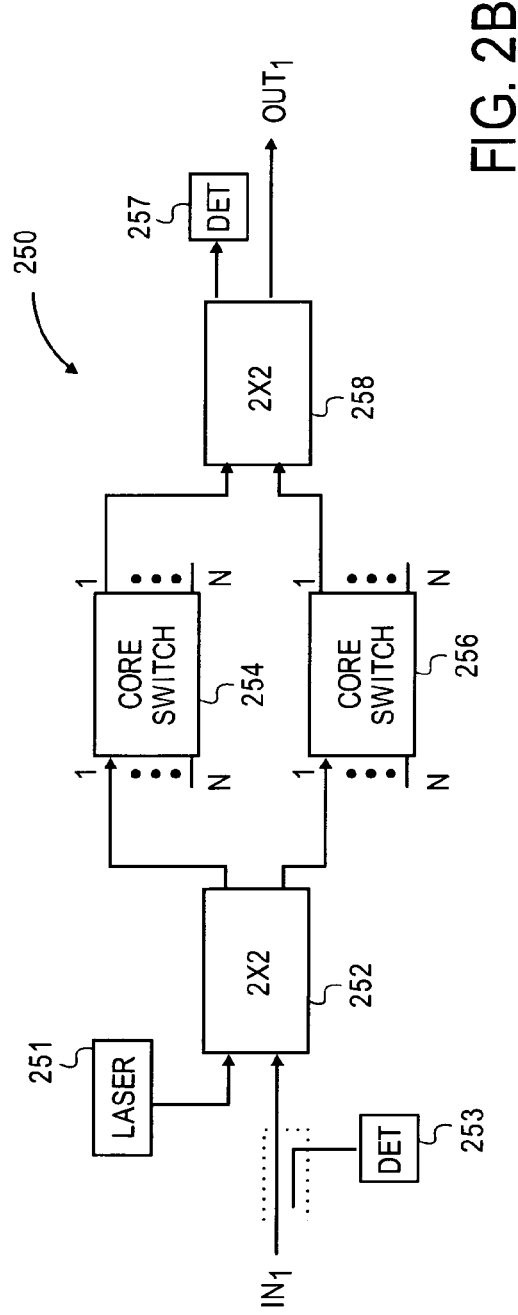
FIG. 2B illustrates one embodiment of an optical switching system providing alternative switch paths to redundant core switches using 2×2 optical switches to select a working switch path and to test the switch paths in which the present invention can be implemented.

FIG. 2B illustrates one embodiment of an optical switching system 250 providing alternative switch paths to redundant core switches 254 and 256 using 2×2 optical switches 252 and 258 to select a working switch path and to test the switch paths. Optical switching system 250 of FIG. 2B operates in a similar manner as optical switching system 200 of FIG. 2A except that a laser 251 can be used to test a backup switch path. Furthermore, a detector 253 can monitor light beams passing through input fiber $IN_1$ and a detector 257 can monitor light beams passing through an output fiber $OUT_1$ of 2×2 optical switch 258.

In the example of FIG. 2B, a laser 251 is used to verify operation of a backup switch path. For example, a main switch path can represent a switch path for an optical beam from input fiber IN1 passing through 2×2 optical switch 252, core optical switch 254 (main core switch), and 2×2 optical 258 to output fiber OUT1. Thus, laser 251 can output an optical beam to 2×2 optical switch 252, which selects the backup switch path to core optical switch 256 for the optical beam. The optical beam is then directed to 2×2 optical switch 258, which directs the optical beam to photodetector ("DET") 257 to test the operability of the backup switch path. For example, photodetectors 253 and 257 can monitor optical loss. Such power monitors can be used to optimize core switch settings.

As will be described in more detail below, 1×2, 2×1, and 2×2 optical switches can be fabricated using a single fiber positioning fixture to position input and output fibers as illustrated (e.g., in the optical switches of FIGS. 3 and 4A through 4E) to provide alternative switch paths for an optical input. By using such exemplary optical switches, individual and separate lens holders are not necessary, thereby increasing the switch capacity to provide alternative paths for an optical input.

Figure 3:
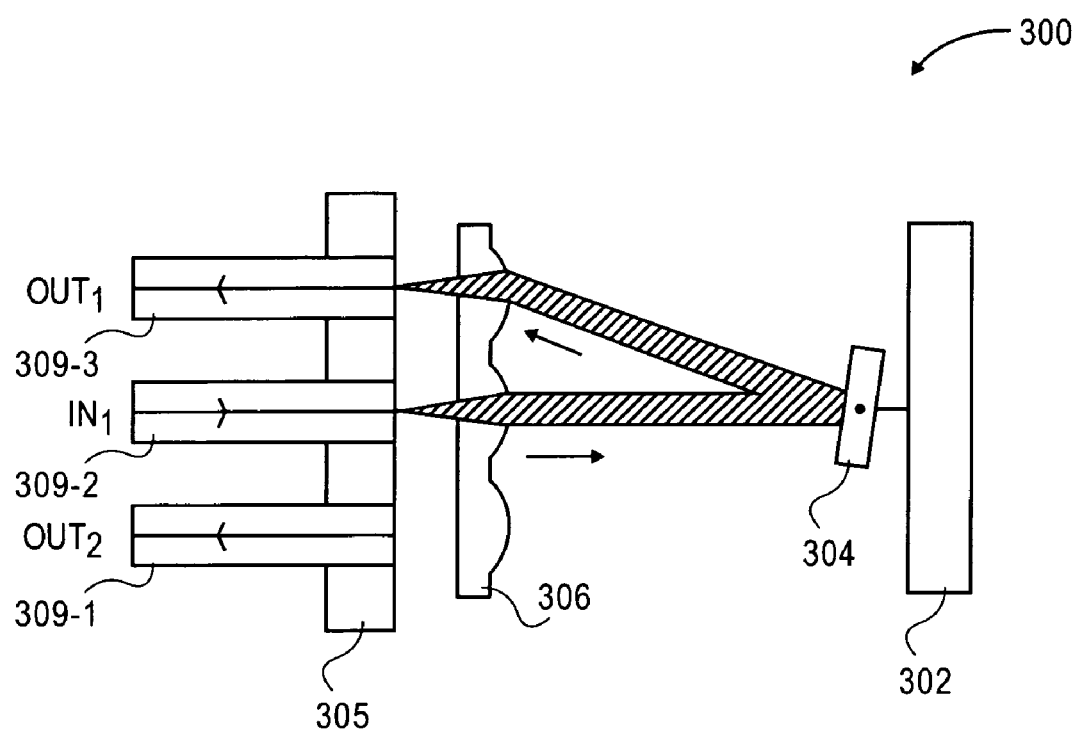
FIG. 3 illustrates one embodiment of a side-view of an optical switch providing alternative optical outputs for an optical input using a single fiber positioning substrate to position the optical inputs and outputs in a parallel manner.

FIG. 3 illustrates one embodiment of a side-view of an optical switch 300 providing alternative optical outputs ($OUT_1$ and $OUT_2$) for an optical input ($IN_1$) using a single fiber positioning fixture or substrate 305 to position the optical inputs and outputs in a coplanar or parallel manner. Optical switch 300 is illustrated as a 1×2 optical switch, which can be used for the 1×2 optical switch of FIG. 2A. Alternatively, optical switch 300 can be a 2×1 optical having two optical inputs and one optical output.

The cross-section view of FIG. 3 shows a single 1×2 optical switch. The single fiber positioning fixture 305 and lens array 306 may contain fibers and lenses for a large number of 1×2 and 2×1 optical switches. For one embodiment, these fibers for other optical switches (not shown) would be positioned in front or behind the fibers illustrated in FIG. 3 perpendicular to the illustration in this view. Alternatively, the fibers for these other switches (not shown) could be positioned above or below the fibers illustrated in FIG. 3.

Referring to FIG. 3, optical switch 300 includes an input fiber 309-2 for optical input $IN_1$ and two output fibers 309-1 and 309-3 for optical outputs $OUT_1$ and $OUT_2$ positioned within fiber positioning fixture 305, a lens array 306 having a plurality of lenses, a mirror substrate 302, and a moveable mirror 304. For one embodiment, fiber positioning fixture 305 is a silicon substrate having a plurality of holes etched therein. The ends of input fiber 309-2 (optical input $IN_1$) and output fibers 309-1 and 309-3 (optical outputs $OUT_1$ and $OUT_3$) are inserted into the holes of fiber positioning fixture 305 such that the optical input and outputs are substantially perpendicular to the surface of the fiber positioning fixture 305.

Fiber positioning fixture 305 aligns fibers for optical input $IN_1$ and optical outputs $OUT_1$ and $OUT_2$ parallel with respect to each other. Fiber positioning fixture 305 can also have a two-dimensional array of holes such that a two-dimensional array of input fibers and output fibers are inserted into the holes. Lens array 306 is placed adjacent to the fiber positioning fixture 305. Lens array 306 may be bonded directly onto fiber positioning fixture 305. Lens array 306 includes a plurality of lenses such that each optical input and output has a corresponding lens. Lens array 306 can be fabricated from glass, silicon, or gallium nitride. Lens array 306 produces noncollinear optical beams such that an optical beam can enter an output fiber in a direct path. Although not shown, a transparent spacer block can be placed in between fiber positioning fixture 305 and lens array 306 to reduce back reflection of light beams into the optical fibers.

Mirror substrate 302 supports moveable mirror 304. For one embodiment, moveable mirror 304 is a MEMS mirror device, which rotates about a hinge caused by electrostatic actuation. Moveable mirror 304 can be configured to rotate about one axis or two axes to provide rotation at orthogonal angles to account for mechanical misalignment of components. Moveable mirror 304 can be configured to provide at least two switch positions by controlling the amount and angle of rotation. Although one moveable mirror is shown, mirror substrate 302 can support a plurality of moveable mirrors. For one embodiment, mirror substrate 302 supports a plurality of moveable mirrors in a two-dimensional array to couple optically inputs and outputs arranged in a two-dimensional array within fiber positioning fixture 305.

In the example of FIG. 3, optical input $IN_1$ outputs a light beam to moveable mirror 304, which redirects the light beam to a lens on lens array 306 that corresponds to optical output $OUT_1$. The lens then focus the light beam into optical output $OUT_1$ in a direct path in which $OUT_1$ can direct the light beam to a main core optical switch. Mirror 304 can also redirect the light beam from optical input $IN_1$ to a lens on lens array 306 corresponding to optical output $OUT_2$. The lens can then focus the light beam into optical output $OUT_2$ in direct path in which $OUT_2$ can direct the light beam to a backup optical switch path.

By using the single fiber positioning fixture 305, the cost per optical switch can be substantially reduced by fabricating multiple parallel or coplanar optical inputs and outputs in a single unit instead of separate holders for each input or output. In addition, optical switch 300 can include a fiber positioning fixture having a two-dimensional array of holes to arrange input and output fibers in an array. Furthermore, an array of mirrors can also be used to provide multiple parallel switches, which can further reduce fabrication costs per switch.

FIGS. 4A through 4D illustrate exemplary embodiments of side-views of a single fiber positioning fixture 405 and a lens array 406 to produce noncollinear arrays of optical beams 402, which can be inputted into optical fibers 408. The following embodiments can be used for the optical switch 300 of FIG. 3. In the following embodiments, single fiber positioning fixture 405 can position a plurality of optical fibers 408 in a two-dimensional array, and lens array 406 can include a two-dimensional array of lenses for each of the optical fibers 408. Optical fibers 408 can represent optical inputs and outputs.

Figure 4B:
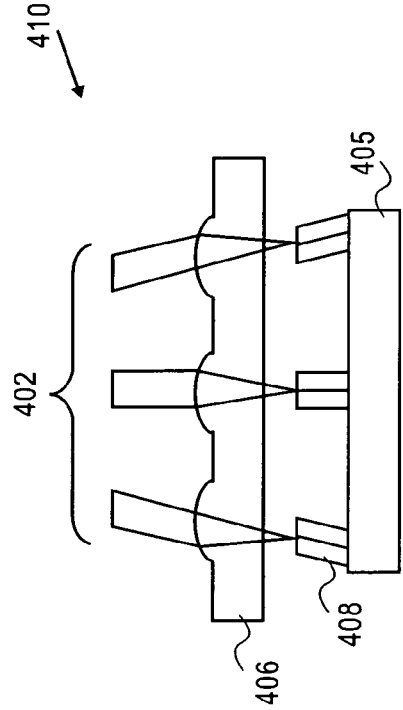
FIGS. 4A through 4D illustrate exemplary embodiments of side-views of a single fiber positioning fixture and a lens array to produce noncollinear arrays of beams.
Figure 4D:
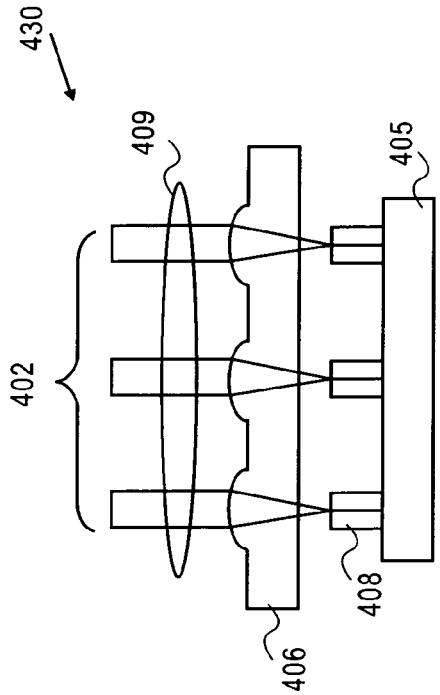
Figure 4A:
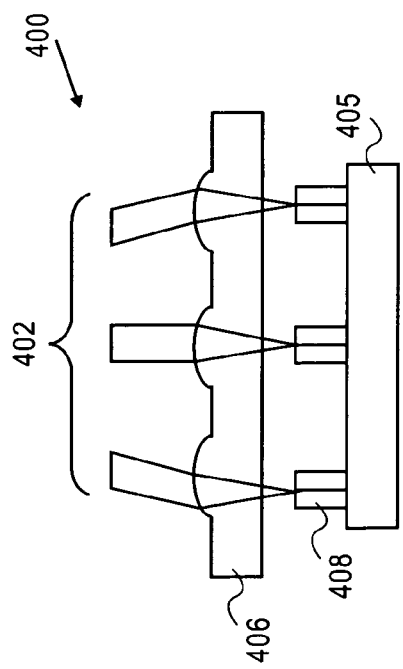
Figure 4C:
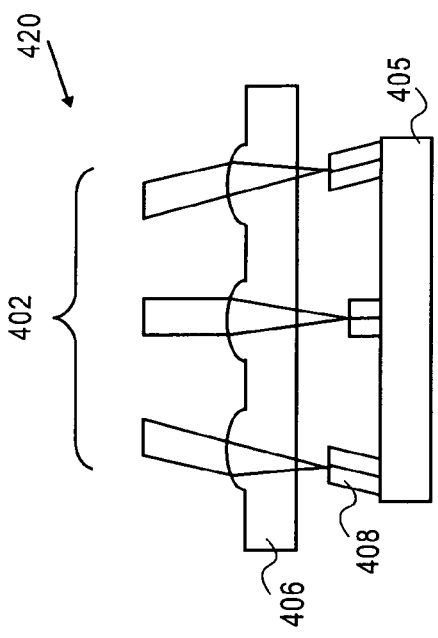

Referring to FIG. 4A, noncollinear optical beams 402 can be produced by lens array 406 by offsetting the lenses with respect to optical beams 402 such that optical beams are collimated to optical fibers 408 in a straight path. Referring to FIG. 4B, one or more of optical fibers 408 can be inserted into fiber positioning fixture 405 at an angle such that optical beams 402 can be received at an angle instead of in a direct path. The ends of the fibers 408 can also be polished to provide a flat surface. Referring to FIG. 4C, optical fibers 408 are configured similarly to fibers 408 of FIG. 4B except that some of the optical fibers can have a different height away from fiber positioning fixture 405 than other optical fibers. Referring to FIG. 4D, a lens 409 can also be used to assist in producing noncollinear optical beams.

Figure 4E:
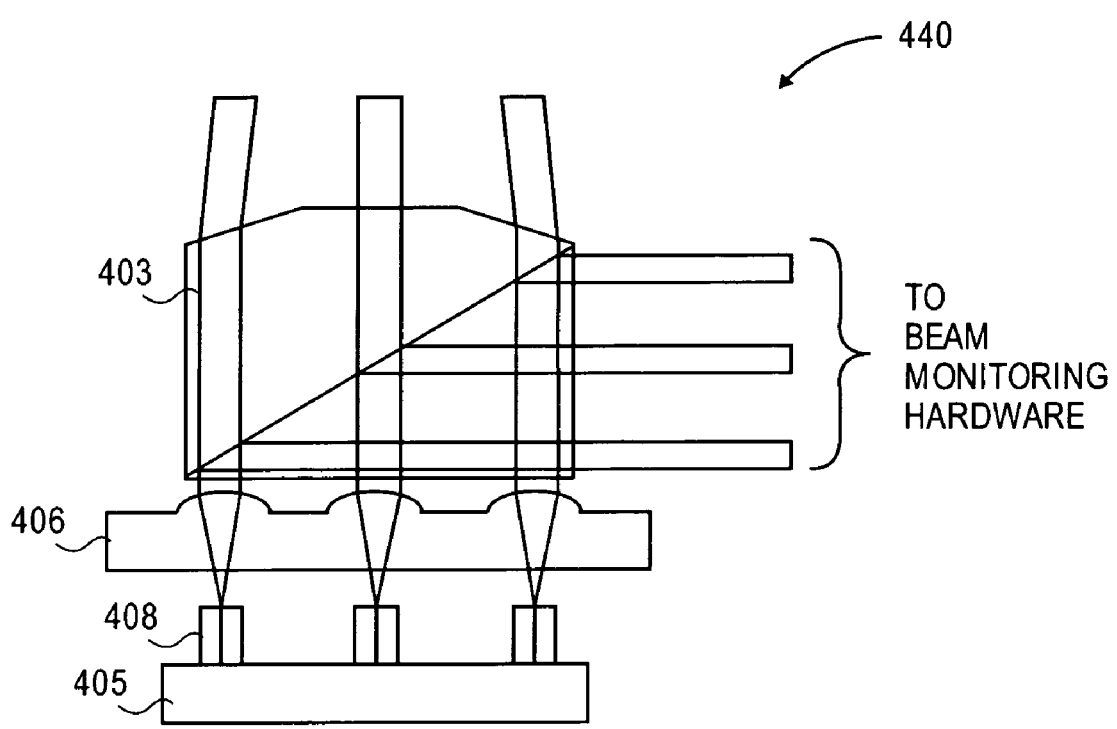
FIG. 4E illustrates an exemplary embodiment of side-view of a single fiber positioning fixture, optical tap, and a lens array to produce noncollinear arrays of beams.

FIG. 4E illustrates an exemplary embodiment of side-view of a single fiber positioning fixture 408, optical tap 403, and lens array 406 to produce noncollinear arrays of optical beams 402. In the example of FIG. 4E, optical tap 403 can be integrated into the optical switch as a free space tap. For example, optical tap 403 can be a beam splitter as shown. Optical tap 403 can direct splitted optical beams 402 to beam monitoring hardware (not shown) with a photodetector to detect optical power or intensity of optical beams passing through the optical switch. Optical tap 403 can also include curved lenses on a surface of optical tap 403 to counteract diffractive optical beam spreading and refocus optical beams 402.

Figure 5:
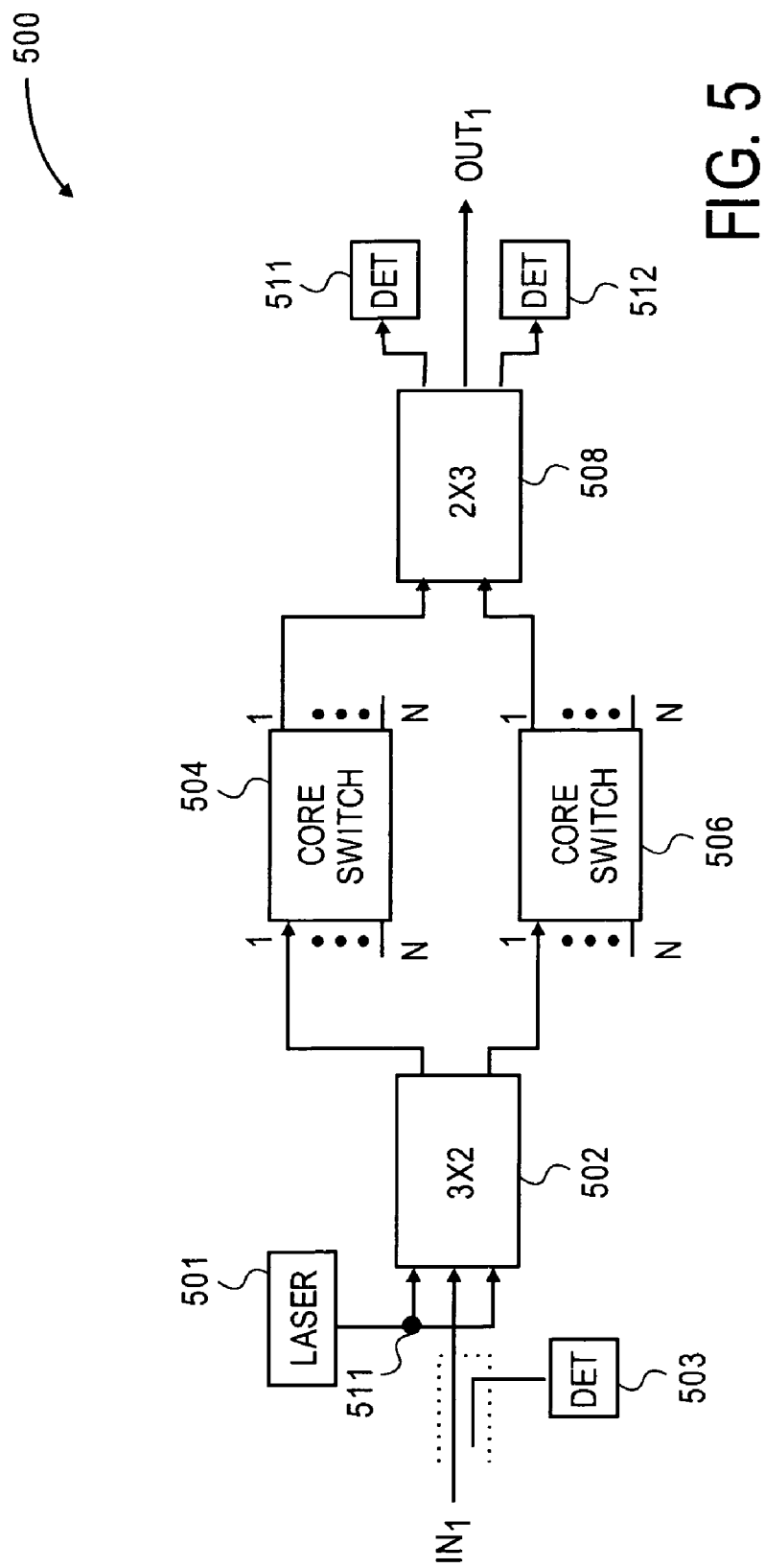
FIG. 5 illustrates one embodiment of an optical switching system providing alternative paths to redundant core switches and means for testing the alternative paths using 3×2 and 2×3 optical switches.

FIG. 5 illustrates one embodiment of an optical switching system 500 providing alternative paths to redundant core switches 504 and 506 and means (laser 501) for testing the alternative paths using 3×2 optical switch 502 and 2×3 optical switch 508. The 3×2 optical switch 502 and 2×3 optical switch 508 are used to select a working switch path for optical switching system 500.

In the example of FIG. 5, similar to the core switches of optical switching systems 200 and 250, one of the core switches 504 and 506 can be a main core switch and the other a backup core switch. Furthermore, although one 3×2 optical switch 502 and 2×3 optical switch 508 are shown, an array of 3×2 and 2×3 optical switches are used at the switch input and output for core switches 504 and 506. The array of 3×2 optical switches or 2×3 optical switches can also be formed within a single optical switch as shown, e.g., in FIGS. 6A, 6B, 7A, and 7B, such that a single fiber positioning fixture can hold the plurality of optical inputs and outputs as a single unit. Furthermore, a single mirror can be used to couple multiple inputs and outputs simultaneously.

Optical switching system 500 provides a simpler switch geometry by using a 3×2 optical switch at the input side and a 2×3 optical switch at the output side as will be explained in further detail below and in FIGS. 6A, 6B, 7A, and 7B. The 3×2 optical switch 502 provides two test inputs for laser 501. For example, reference number 511 can represent a 1×2 optical power splitter to allow laser 501 to provide an optical beam to two inputs of 3×2 optical switch 502. Such an embodiment is described below in reference to FIG. 12A. Multiple optical splitters can also be combined into an array for improved packing density and ease of handling. Thus, laser 501 can provide an optical beam to more than one input port of an optical switch.

In a redundant system having a main core switch (e.g., core switch 504) and a backup core switch (e.g., core switch 506), laser 501 may drive all of one input to an array of 3×2 optical switches, and a second laser may be used to drive all of the other inputs. Thus, if a laser (e.g., laser 501) is testing a backup switch path and the main switch path fails, 3×2 optical switch 502 can select the backup switch path, and the other laser can be used to monitor the main switch path while the backup switch is being used. In such a configuration, the optical switches on the input side and output side need only to have two switch inputs. Furthermore, the 2×3 optical switches can have two photodetectors coupled to two of its outputs, e.g., photodetectors 511 and 512 coupled to 2×3 optical switch 508, which can be used to monitor optical power of optical beams passing through the main switch path or backup switch path. Such an embodiment is described below in reference to FIG. 13B. 2×3 optical switch 508 also includes an optical output $OUT_1$ to output an optical signal being passed on the main switch path or backup switch path.

FIGS. 6A through 6B illustrate exemplary embodiments of side-views 600 and 650 of the 3×2 or 2×3 optical switches of FIG. 5 providing alternative optical outputs for an optical input using a single fiber positioning fixture 605 to position the optical inputs ($IN_1$, $IN_2$) and outputs ($OUT_1$, $OUT_{2A}$, $OUT_{2B}$) in a co-planar or parallel manner. In the following examples, 2×3 optical switches are shown. Nevertheless, a 3×2 optical switch can be implemented by reversing the optical inputs and outputs. The optical switches shown in side-views 600 and 650 operate and are constructed in a similar manner as the optical switches of FIGS. 3 and 4A through 4E.

Referring to FIG. 6A, optical switch 600 is illustrated as a 3×2 optical switch. Nevertheless, optical switch 300 can also be configured as a 2×3 optical switch. 3×2 optical switch 300 provides alternative optical outputs ($OUT_1$ and $OUT_2$) for output fibers 608-2 and 608-4 and three optical inputs ($IN_1$, $IN_{2A}$, and $IN_{2B}$) for input fibers 608-3, 608-5, and 608-1. Optical switch 600 includes a mirror substrate 602 supporting a moveable mirror 604, lens array 606, and a single fiber positioning fixture 605 positioning optical inputs $IN_1$, $IN_{2A}$, and $IN_{2B}$ and optical outputs $OUT_1$ and $OUT_2$. Mirror substrate 602, moveable mirror 604, lens array 606, and single fiber positioning fixture 605 operate and can be fabricated in the same manner as the same in FIGS. 3 and 4A through 4E.

In the example of FIG. 6A, mirror 604 is rotated to couple $IN_1$ with $OUT_1$ and is able to couple simultaneously $IN_{2A}$ with $OUT_2$. Also, input $IN_{2B}$ is added to couple with $OUT_1$ if $IN_1$ is connected to $OUT_2$. Referring to FIG. 6B, a lens on lens array 606 corresponding to input fiber $IN_{2B}$ is off-centered such that mirror 604 is rotated to couple $IN_{2B}$ with $OUT_1$. That is, the lens can redirect an optical beam from $IN_{2B}$ to mirror 604. Furthermore, mirror 604 is rotated to couple $IN_1$ to $OUT_2$, and mirror 604 can simultaneously couple $IN_{2B}$ to $OUT_1$.

The 3×2 switch of FIGS. 6A and 6B can be used for protection switching in the configuration of FIG. 5 by injecting test light from laser 501 into inputs $I_{2A}$ and $IN_{2B}$, and directing output $OUT_1$ and $OUT_2$ to main and redundant core switches and 506. Alternatively, the direction on the optical signals of FIGS. 6A and 6B can be reversed to form a 2×3 optical switch, where $OUT_1$ and $OUT_2$ receive light beams from main and redundant core switches 504 and 506, and $IN_{2A}$ and $IN_{2B}$ become outputs to direct optical beam to photodetectors 511 and 512 for monitoring purposes. For example, photodetectors 511 and 512 can be used to test operability of a main or backup switch path. For one embodiment, to decrease optical fiber coupling loss the photodetectors, multimode optical fibers are used to connect the test outputs of the 2×3 switches to photodetectors 511 and 512. To decrease optical fiber coupling loss and fabrication costs, photodetectors also can be included into the switch package as shown in FIGS. 7A and 7B.

Figure 7B:
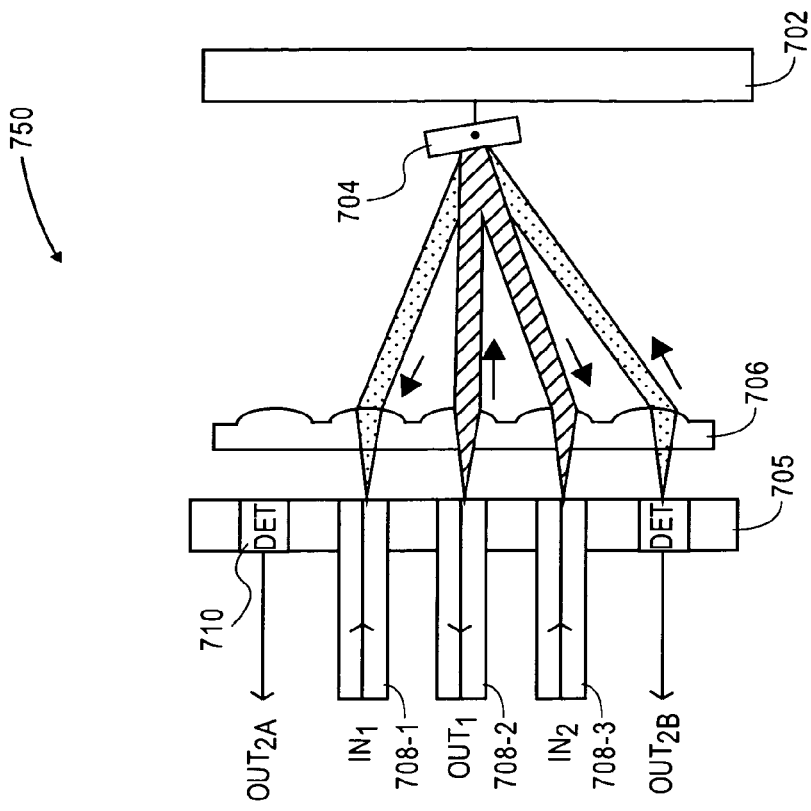
FIGS. 7A and 7B illustrate exemplary embodiments of side-views of the 3×2 or 2×3 optical switches of FIG. 5 with photodetectors providing alternative optical outputs for an optical using a single fiber positioning fixture to position the optical inputs and outputs in a co-planar or parallel manner.
Figure 7A:
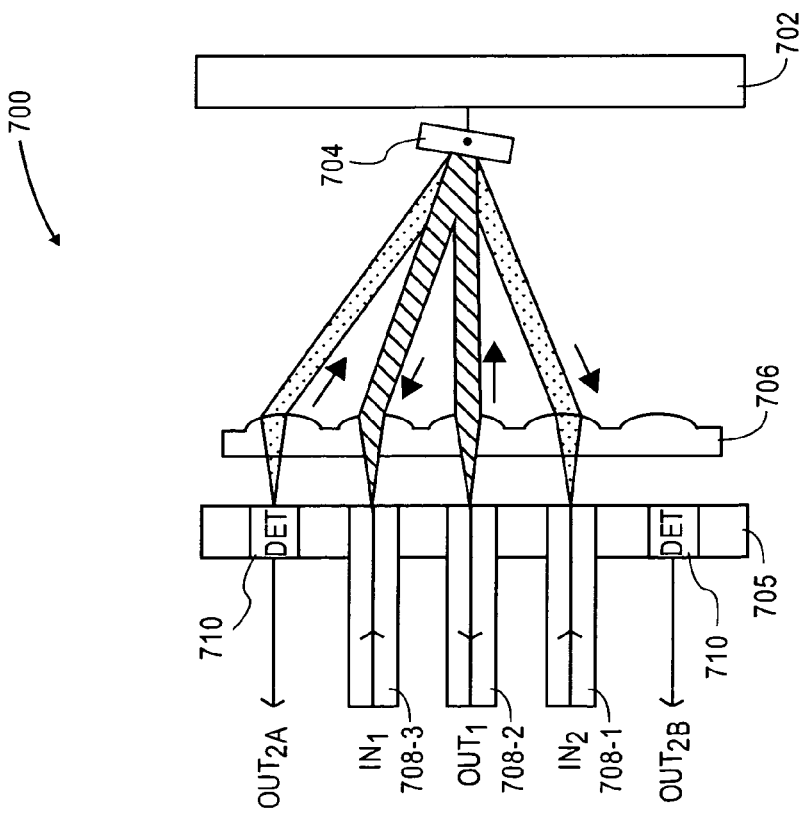

FIGS. 7A and 7B illustrate exemplary embodiments of side-views 700 and 750 of the 2×3 optical switches of FIG. 5 with photodetectors 710 providing alternative optical outputs for an optical input using a single fiber positioning substrate 705 to position the optical inputs ($IN_1$, $IN_2$) and outputs ($OUT_1$, $OUT_{2A}$, $OUT_{2B}$) in a co-planar or parallel manner. The optical switches shown in side-views 700 and 750 operate and are constructed in a similar manner as the optical switches shown in FIGS. 6A and 6B except that the signal directions are reversed such that inputs IN2A and IN2B become outputs coupled to photodetectors 710. In these examples, 2×3 optical switches are shown. Nevertheless, 3×2 optical switches can be implemented by reversing the optical inputs and outputs in which case photodetectors 710 would be replaced by optical sources such as semiconductor lasers.

The examples of FIGS. 7A and 7B avoid having to couple optical beams into an optical fiber for monitoring purposes by having the optical beam directed to photodetectors 710. For one embodiment, photodetectors 710 are formed by depositing or patterning an optical absorbing material (e.g., material for a photodiode) on lens array 706 or single fiber positioning fixture 705 to act as a photodetector. Thus, photodetectors 710 can be used to test the operability of a main switch path or backup switch path. For one embodiment, photodetectors 710 or optical sources are not coupled to mirror 704 with the same lens array 706 for these signals coupled to optical fibers, but are instead placed elsewhere in the optical package.

Figure 8:
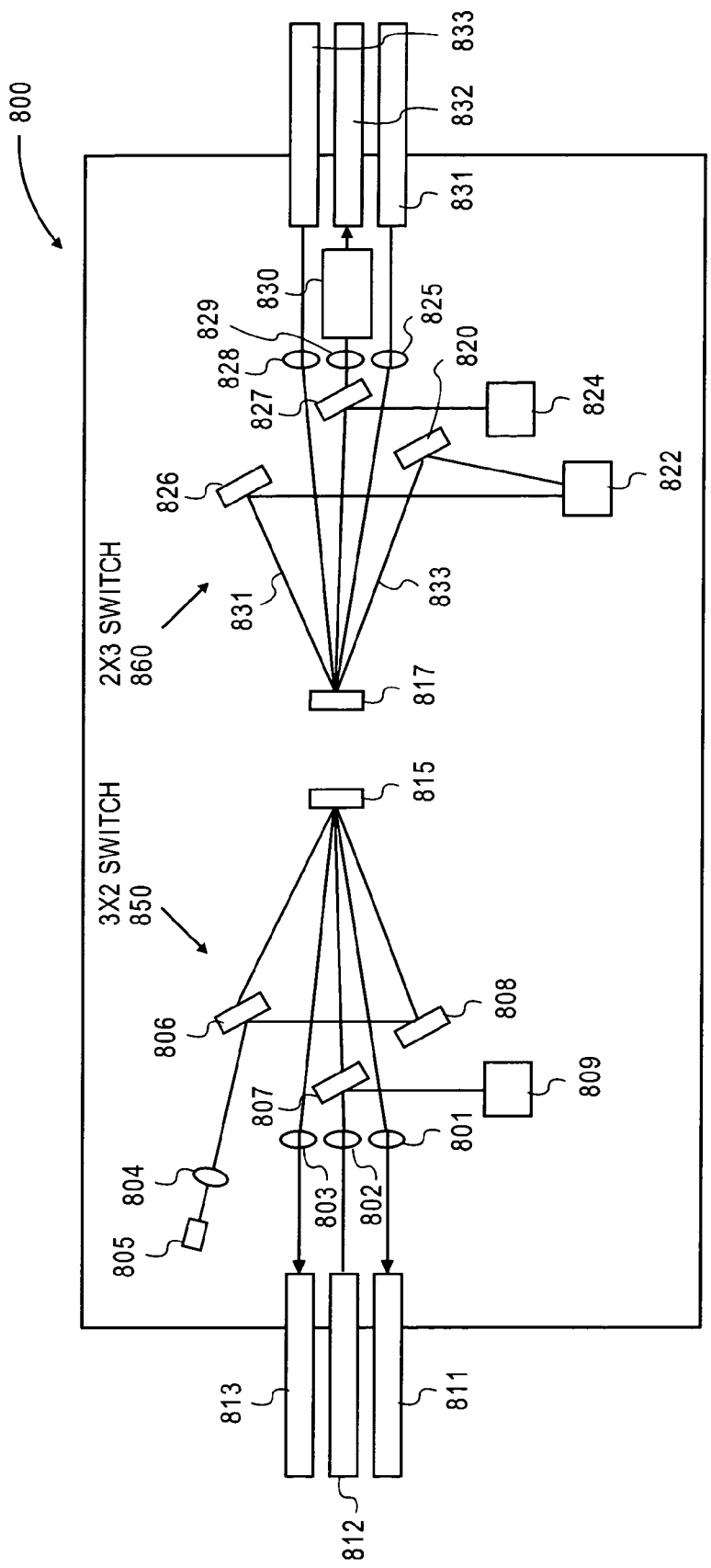
FIG. 8 illustrates one embodiment of an optical switching system having a 1×2 optical path protection using photodetectors inside an optical switch package with a main switch position and a backup switch position.

FIG. 8 illustrates one embodiment of an optical switching system having a 1×2 optical path protection using photodetectors inside an optical switch package 800 with a main switch position and a backup switch position. Within optical switch package 800 includes a 3×2 protection switch 850 and a 2×3 protection switch 860, which are built in the package with the a laser source 805 and photodetectors 809, 822, and 824. That is, in the example of FIG. 8, both the input 3×2 switch 850 and output 2×3 switch 860 are integrated into the same package.

A beam splitter 806 also resides within optical switch package 800, providing the same function as splitter 511 in FIG. 5. The lenses 801, 802, 803, 804, 825, 828, and 829 also reside within optical switch package 800. Moveable mirrors 815 and 817 can be MEMS mirror devices. The number of photodetectors can be reduced by directing both of the monitor outputs 831 and 833 from the 2×3 switch 860 onto the same photodetector 822 as shown. Monitor output 833 is directed onto photodetectors 822 using additional mirror 820. In this example, lens arrays are not used.

Consequently, the optics can be adjusted to account for fixed variations in the MEMS mirror 815 and 817 rotation by individually adjusting each of the lenses or fiber position 811–813 and 831–833. However, lenses 801, 802, and 803 can be monolithically integrated as well as lenses 825, 828, and 829. Angular rotation for MEMS mirrors 815 and 817 can be limited with mechanical stops for highly repeatable operation. Furthermore, the MEMS mirrors 815 and 817 can remain in either of two switch positions if external power to the optical switch is removed.

A potential problem with this configuration is that the rotating mirrors 815 and 817 can reflect energy back into the input fiber during the switching operation between output states, as the undesired mirror position pointing back towards the input fiber is halfway between the two desired mirror positions. This could cause an unacceptable level of back-reflection for a fraction of a millisecond during switching, based on the switching speed of a typical MEMS mirror. This back-reflection problem can be suppressed in a mirror with two axes of rotation, as the mirror can be steered around this undesirable reflection condition in the other axis.

Figure 9A:
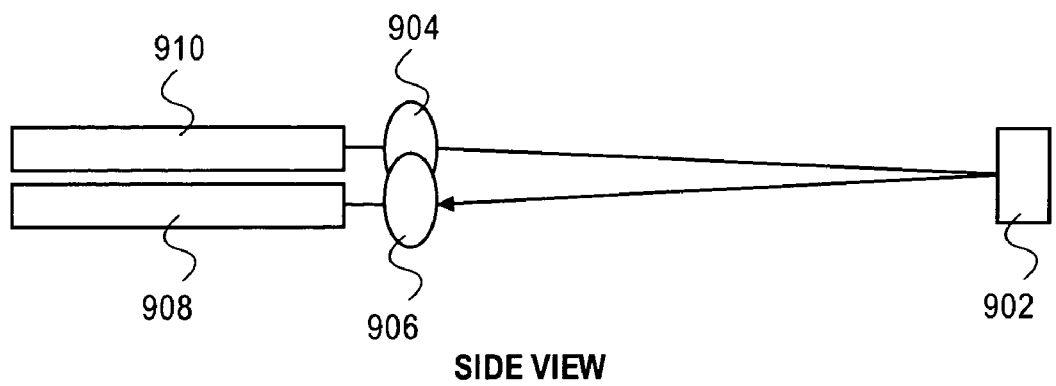
FIGS. 9A and B illustrate non-coplanar input and output beams to minimize optical back-reflection using a mirror with only one axis of rotation.
Figure 9B:
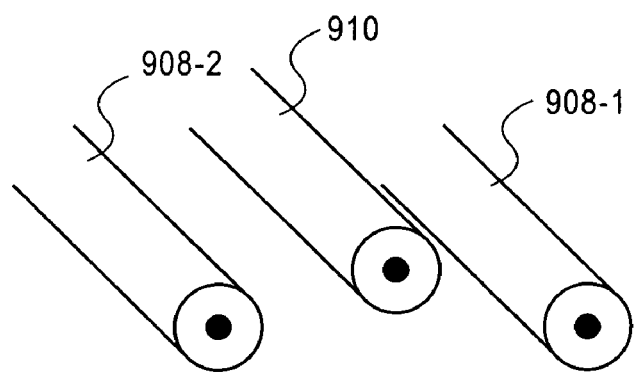

A solution for this back-reflection problem when using a mirror with one axis of rotation is illustrated in FIGS. 9A and 9B. Referring to FIGS. 9A and 9B, an input beam from an optical fiber 910 is not coplanar with the two output beams. In this example, the input fiber 910 is higher than the two output fibers 908-1 and 908-2 compared to the plane of beam propagation. Thus, the input beam is steered downward to the mirror 902, then downward to the output fiber 908-1 or 908-2. This effect is greatly exaggerated for illustration. As the mirror 902 rotates between the two desired positions, the output beam is directed downward relative to the input beam and does not directly couple back into the input beam.

As discussed above in reference to FIG. 2B, the use of non-blocking 2×2 optical switches allows for testing and monitoring of the redundant path while not in use. When a 2×2 non-blocking optical switch is used as a protection switch, only the path that data traverses need be low loss. The other path, (e.g., the path carrying the test light signal and detecting the test light signal) need not be low loss.

Figure 10:
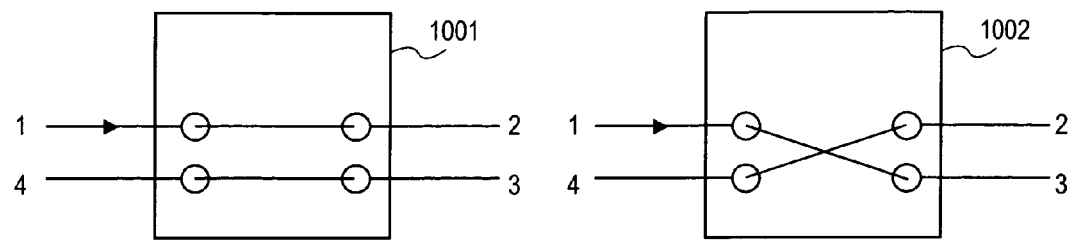
FIG. 10 illustrates the low loss paths required in a non-blocking 2×2 switch for use as a protection switch in an optical switching system.

FIG. 10 illustrates the low loss paths required in a non-blocking 2×2 switch for use as a protection switch in an optical switching system in accordance with one embodiment of the present invention. Optical switch position 1001 has paths 1-2 and 4-3. Only one of these paths (e.g., path 1-2) need be optimized for low loss to carry customer data traffic on the active path. The other path (e.g., path 4-3) need not be optimized for low loss as it will function to carry a test signal that may be amplified or calibrated. Optical switch position 1002 has paths 1-3 and 4-2. Again, only one of these paths (e.g., path 1-3) need be optimized for low loss to carry customer data traffic on the redundant path. In the example of FIG. 10, port 4 is not included in any low loss path. Port 4 therefore may be used for either injecting a test light or monitoring light, both of which do not need low loss paths.

The manufacture of a non-blocking 2×2 optical switch for use as a protection switch may therefore be less complex, less expensive, and provide greater path loss optimization (lower loss) compared to the manufacture of a typical non-blocking 2×2 optical switch.

Depending upon the technology used to manufacture an optical switch, a non-blocking switch (e.g., a 2×2 non-blocking switch) may be more complex and costly to manufacture than a blocking switch (e.g., a 2×3 blocking switch). This is because non-blocking optical switches, by definition, must be designed such that any input has a path to any output. The design of blocking optical switches does not have this constraint. It therefore may be more economical to implement a 2×3 blocking optical switch in place of a 2×2 non-blocking optical switch as a protection switch in an optical switching system.

Figure 11A:
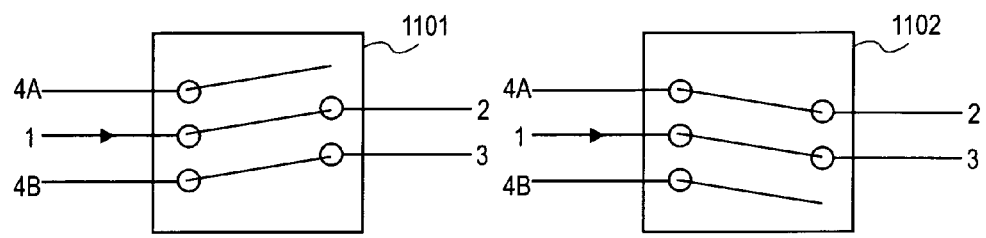
FIG. 11A illustrates the optical paths of a blocking 3×2 optical switch for use as a protection switch in an optical switching system.

FIG. 11A illustrates the optical paths of a blocking 3×2 optical switch for use as a protection switch in an optical switching system in accordance with one embodiment of the present invention. Optical switch position 1101 has paths 1-2 and 4*b*-3, with input 4*a* unconnected to any output. Path 1-2 may carry customer data on the active path while path 4*b*-3 may carry a test signal or monitoring signal. Optical switch position 1102 has paths 4*a*-2 and 1-3. Path 1-3 may carry customer data on the redundant path while path 4*a*-2 may carry a test signal or monitoring signal. Port 4*a* is never connected to port 3 and port 4*b* is never connected to port 2.

In an optical switching system (for example, the optical switching system of FIG. 5), the array of 3×2 optical switches or 2×3 optical switches may be translational switches as described with reference to FIG. 11B. A translational switch uses the mechanical displacement of an optical fiber to switch an optical input between n optical outputs. The input fiber is mounted on a micromachined linear translational substrate with n corresponding output fibers mounted opposite the input fiber to receive the optical signal. The output fibers may be mounted on a translational substrate as well. A thin film of ferromagnetic material is deposited on the input fiber (and/or output fiber) translational substrate. A magnetic field is applied causing either, or both, of the substrates to translate (move in relation to one another) so that the input fiber is aligned with the appropriate output fiber. The substrates of such a translational switch may be silicon, ceramic, glass, or other similar materials and is translated through magnetic actuation or other means, known in the art (e.g., electrostatic actuation).

Figure 11B:
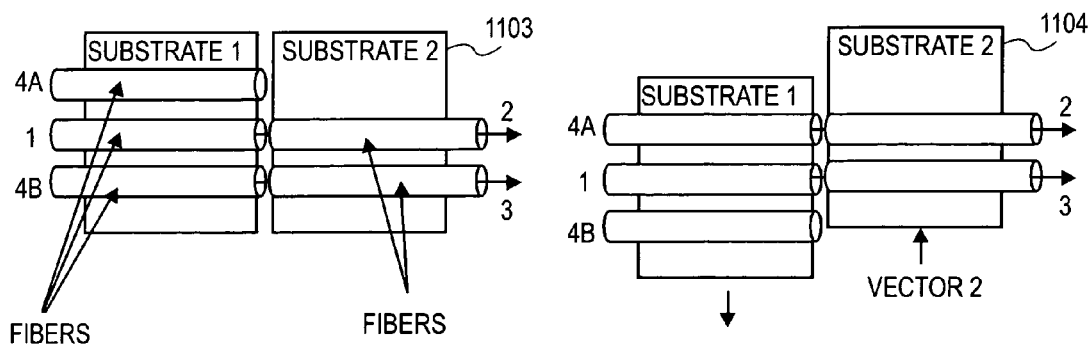
FIG. 11B illustrates a translational blocking 3×2 optical switch for use as a protective switch in an optical switching system.

FIG. 11B illustrates a translational blocking 3×2 optical switch for use as a protective switch in an optical switching system in accordance with one embodiment of the present invention. A 3×2 translational blocking switch may be fabricated as shown in FIG. 11B with 3 fibers namely, fibers 4*a*, 1, and 4*b*—mounted on substrate 1—and 2 fibers namely, fibers 2 and 3—mounted on substrate 2. Switch position 1103 has paths 1-2 and 4*b*-3. Switch position 1104, has paths 4*a*-2 and 1-3 which is the result of substrate 2 being translated by vector 2.

Translational switches may be simpler and less expensive to manufacture as blocking switches, but do not lend themselves to non-blocking switches. An embodiment of the present invention replaces the 2×2 non-blocking optical switch of FIG. 2B with a 3×2 blocking switch having a simpler design.

Figure 12A:
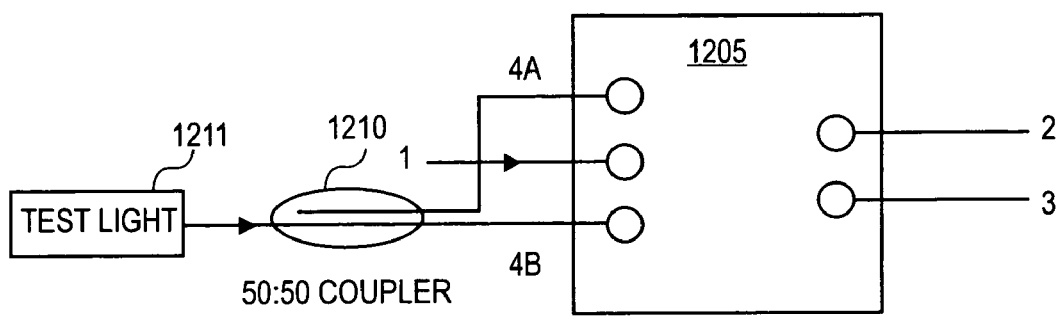
FIGS. 12A and 12B illustrate how a blocking 3×2 switch may be used as a protection switch on the input side of optical switching system.
Figure 12B:
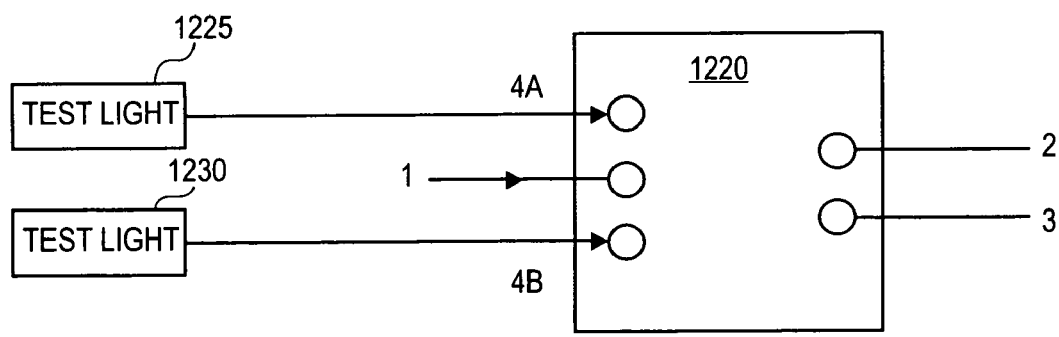

FIGS. 12A and 12B illustrates how a blocking 3×2 switch may be used as a protection switch on the input side of optical switching system 500 (3×2 switch 502) shown in FIG. 5. Switch 1205, shown in FIG. 12A, uses a coupler 1210 to feed inputs 4*a* and 4*b* with the same test light input from laser 1211. The reduced test light power at the input to the blocking 3×2 switch due to splitting the optical power may be compensated for by increasing the test light bias current. Such a configuration may be defined as a 2:2×2, where the 2:2 represents the beam splitter's function and the 2×2 represents switching function. FIG. 12B illustrates an alternative embodiment in which switch 1220 uses two test lasers 1225 and 1230 to feed inputs 4*a* and 4*b* respectively. Such a configuration allows independent operation of the test light in each input to the 3×2 switch.

Figure 13A:
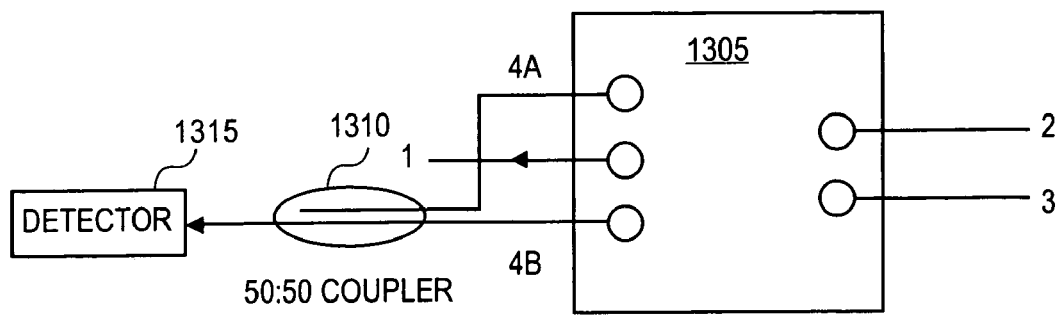
FIGS. 13A, 13B, and 13C illustrate how a blocking 2×3 switch may be used as a protection switch on the output side of optical switching system.
Figure 13B:
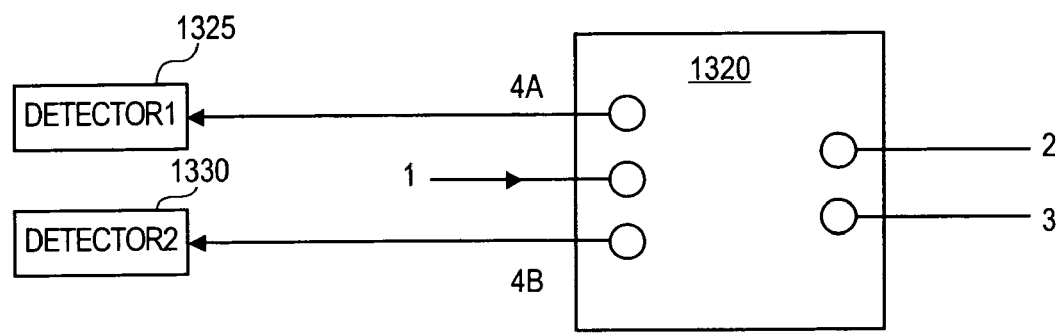
Figure 13C:
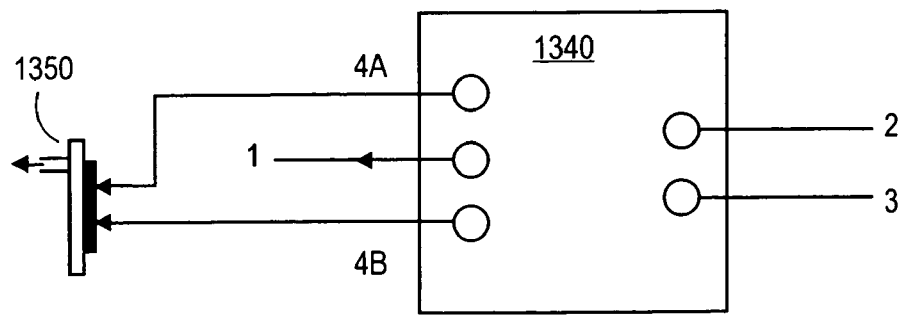

FIGS. 13A, 13B, and 13C illustrate how a blocking 2×3 switch may be used as a protection switch on the output side of optical switching system 500 (2×3 switch 508) shown in FIG. 5. In FIG. 13A, switch 1305 uses a coupler 1310 to feed outputs 4*a* and 4*b* to the single detector 1315. FIG. 13B illustrates an alternative embodiment in which switch 1320 has outputs 4*a* and 4*b* fed to separate detectors 1325 and 1330, respectively. FIG. 13C illustrates an alternative embodiment in which switch 1340 has outputs 4*a* and 4*b* fed to a single large detector 1350. The detector 1350 and associated amplifying electronics, not shown, may be used to monitor the outputs 4*a* and 4*b* of the blocking 3×2 optical switch. Such a configuration eliminates the added complexity and expense of including a coupler as in switch 1305, or having two detectors as in switch 1320. In one embodiment, using fibers having a diameter of 125 microns, detector 1350 is greater than 250 microns in diameter. In another embodiment, one or more lenses are used to focus light from fibers 4*a* and 4*b* onto photodectector 1350.

For alternative embodiments, higher levels of integration may allow the coupler shown in FIGS. 12A and 13A to be included within the package of the blocking 3×2 optical switch.

Thus a 3×2 optical switch (e.g. a 3×2 translational blocking switch) may be implemented as a protection switch within an optical switching system in lieu of a 2×2 non-blocking switch (e.g., 2×2 non-blocking switch 202).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus comprising:
   a first optical core switch;
   a second optical core switch; and
   an input blocking 3×2 optical switch to direct input optical data traffic to either of the first optical core switch or the second optical core switch, and to direct a test signal to the other of the first optical core switch and the second optical core switch to which the optical data traffic is not directed.

2. The apparatus of claim 1, wherein the input blocking 3×2 optical switch is a translational optical switch.

3. The apparatus of claim 1, further comprising:
   a first optical test source optically coupled to a first input port of the input blocking 3×2 optical switch, the first optical test souse providing a first test signal to the first input port of the input blocking 3×2 optical switch; and
   a second optical test source optically coupled to a second input port of the input blocking 3×2 optical switch, the second optical test source providing a second test signal to the second input port of the input blocking 3×2 optical switch.

4. The apparatus of claim 1, further comprising:
a coupler optically coupled to a first input port of the input blocking 3×2 optical switch and optically coupled to a second input port of the input blocking 3×2 optical switch; and
an optical test source optically coupled to the coupler such that the optical test source provides a test signal to the first input port of the input blocking 3×2 optical switch and the second input port of the input blocking 3×2 optical switch.

5. The apparatus of claim 1, further comprising:
an output optical protection switch having at least two inputs and at least two outputs, the output optical protection switch to direct output optical data traffic from either of the first optical core switch or the second optical core switch, and to direct a test signal from the other of the first optical core switch and the second optical core switch from which the optical data traffic is not directed.

6. The apparatus of claim 5, wherein the output optical protection switch is implemented as an output blocking 2×3 optical switch.

7. The apparatus of claim 6, wherein the output blocking 2×3 optical switch is a translational optical switch.

8. The apparatus of claim 6, further comprising:
a first optical detector optically coupled to a first output port of the output blocking 2×3 optical switch, the first optical detector detecting a first test signal from the first output port of the output blocking 2×3 optical switch; and
a second optical detector optically coupled to a second output port of the output blocking 3×2 optical switch, the second optical detector detecting a second test signal from the second output port of the output blocking 2×3 optical switch.

9. The apparatus of claim 6, further comprising:
a coupler optically coupled to a first output port of the output blocking 2×3 optical switch and optically coupled to a second output port of the output blocking 2×3 optical switch; and
an optical detector optically coupled to the coupler such that the optical detector detects a test signal from the first output port of the output blocking 2×3 optical switch and the second output port of the output blocking 2×3 optical switch.

10. The apparatus of claim 6, further comprising:
an optical detector optically coupled to a first output port of the output blocking 2×3 optical switch and a second output port of the output blocking 3×2 optical switch, the optical detector detecting a first test signal from the first output port of the output blocking 2×3 optical switch and a second test signal from the second output port of the output blocking 2×3 optical switch.

11. The apparatus of claim 4, wherein the coupler and the input blocking 3×2 optical switch are integrated within a single package.

12. The apparatus of claim 9, wherein the coupler and the output blocking 3×2 optical switch are integrated within a single package.

13. A method comprising:
coupling a first optical core switch to a first output of an input blocking 3×2 optical protection switch; and
coupling a second optical core switch to a second output of the input blocking 3×2 optical protection switch, such that the input blocking 3×2 optical protection switch can direct input optical data traffic to either of the first optical core switch or the second optical core switch, and to direct a test signal to the other of the first optical core switch and the second optical core switch to which the optical data traffic is not directed.

14. The method of claim 13, wherein the input blocking 3×2 optical switch is a translational optical switch.

15. The method of claim 13, further comprising
optically coupling a first optical test source to a first input port of the input blocking 3×2 optical switch, the first optical test source providing a first test signal to the first input port of the input blocking 3×2 optical switch; and
optically coupling a second optical test source to a second input port of the input blocking 3×2 optical switch, the second optical test source providing a second test signal to the second input port of the input blocking 3×2 optical switch.

16. The method of claim 13, further comprising:
optically coupling a coupler to a first input port of the input blocking 3×2 optical switch and optically coupled to a second input port of the input blocking 3×2 optical switch; and
optically coupling an optical test source to the coupler such that the optical test source provides a test signal to the first input port of the input blocking 3×2 optical switch and the second input port of the input blocking 3×2 optical switch.

17. The method of claim 13, further comprising:
coupling the first optical core switch to a first input of an output optical protection switch, the output optical protection switch having at least two inputs and at least two outputs; and
coupling the second optical core switch to a second input of the output optical protection switch such that the output optical protection switch can direct output optical data traffic from either of the first optical core switch or the second optical core switch, and can direct a test signal from the other of the first optical core switch and the second optical core switch from which the optical data traffic is not directed.

18. The method of claim 17, wherein the output optical protection switch is implemented as an output blocking 2×3 optical switch.

19. The method of claim 18, wherein the output blocking 2×3 optical switch is a translational optical switch.

20. The method of claim 18, further comprising:
optically coupling a first optical detector to a first output port of the output blocking 2×3 optical switch, the first optical detector detecting a first test signal from the first output port of the output blocking 2×3 optical switch; and
optically coupling a second optical detector to a second output port of the output blocking 3×2 optical switch, the second optical detector detecting a second test signal from the second output port of the output blocking 2×3 optical switch.

21. The method of claim 18, further comprising:
optically coupling a coupler to a first output port of the output blocking 2×3 optical switch and optically coupled to a second output port of the output blocking 2×3 optical switch; and
an optical detector optically coupled to the coupler such that the optical detector detects a test signal from the first output port of the output blocking 2×3 optical switch and the second output port of the output blocking 2×3 optical switch.

22. The method of claim 18, further comprising:
optically coupling an optical detector to a first output port of the output blocking 2×3 optical switch and a second output port of the output blocking 3×2 optical switch, the optical detector detecting a first test signal from the first output port of the output blocking 2×3 optical switch and a second test signal from the second output port of the output blocking 2×3 optical switch.

23. The method of claim 16, wherein the coupler and the input blocking 3×2 optical switch are integrated within a single package.

24. The method of claim 21, wherein the coupler and the output blocking 3×2 optical switch are integrated within a single package.

25. An optical protection switch comprising:
a first substrate having a first fiber, a second fiber, and a third fiber positioned thereon, the first fiber and the second fiber forming a first set of adjacent fibers and the second fiber and the third fiber forming a second set of adjacent fibers; and
a second substrate having two fibers positioned thereon, the first substrate and the second substrate capable of being translated, relative to each other, into a first position and a second position, the first position providing optical coupling between the first set of adjacent fibers and the two fibers positioned on the second substrate, the second position providing optical coupling between the second set of adjacent fibers and the two fibers positioned on the second substrate.

26. The optical protection switch of claim 25, wherein the two fiber positioned on the second substrate are connected to a first core optical switch and a second core optical switch.

27. The optical protection switch of claim 26 further comprising:
an output optical protection switch wherein the first core optical switch and the second core optical switch are connected to the output optical switch, the output optical switch comprising:
a third substrate having two fibers positioned thereon;
a fourth substrate having positioned thereon a fourth fiber, a fifth fiber, and a sixth fiber, the fourth fiber adjacent to the fifth fiber and forming a third set of adjacent fibers therewith, the fifth fiber adjacent to the sixth fiber and forming a fourth set of adjacent fibers therewith, the third substrate and the fourth substrate are capable of being translated in relation to one another into a third position and a fourth position, the third position providing optical coupling between the two fibers positioned on the third substrate and the third set of adjacent fibers, the fourth position providing optical coupling between the two fibers positioned on the third substrate and the fourth set of adjacent fibers.

* * * * *